(12) United States Patent
Naruniec et al.

(10) Patent No.: US 12,555,273 B2
(45) Date of Patent: Feb. 17, 2026

(54) GENERATING AN IMAGE INCLUDING A SOURCE INDIVIDUAL

(71) Applicants: DISNEY ENTERPRISES, INC., Burbank, CA (US); ETH Zürich (Eidgenössische Technische Hochschule Zürich), Zürich (CH)

(72) Inventors: Jacek Krzysztof Naruniec, Zug (CH); Manuel Jakob Kansy, Horgen (CH); Graziana Mignone, Illnau (CH); Christopher Richard Schroers, Uster (CH); Romann Matthew Weber, Uster (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 317 days.

(21) Appl. No.: 18/320,117

(22) Filed: May 18, 2023

(65) Prior Publication Data
US 2023/0377213 A1 Nov. 23, 2023

Related U.S. Application Data

(60) Provisional application No. 63/343,944, filed on May 19, 2022.

(51) Int. Cl.
*G06T 11/00* (2006.01)
*G06V 10/776* (2022.01)
(Continued)

(52) U.S. Cl.
CPC ............ *G06T 11/00* (2013.01); *G06V 10/776* (2022.01); *G06V 10/82* (2022.01); *G06V 40/172* (2022.01); *G06V 40/178* (2022.01)

(58) Field of Classification Search
CPC ...... G06T 11/00; G06V 10/776; G06V 10/82; G06V 40/172; G06V 40/178; G06V 10/77; G06V 10/774; G06V 40/168
See application file for complete search history.

(56) References Cited

U.S. PATENT DOCUMENTS 10,482,600 B2 * 11/2019 Zhou ................. G06N 3/084
10,885,608 B2 * 1/2021 Zhang ................ G06T 3/4046
(Continued)

OTHER PUBLICATIONS

Bao et al., "Towards Open-Set Identity Preserving Face Synthesis", arXiv:1803.11182, Aug. 9, 2018, pp. 1-10.
(Continued)

*Primary Examiner* — Tom Y Lu
(74) *Attorney, Agent, or Firm* — Squire Patton Boggs LLP; Sarah Mirza

(57) ABSTRACT

One embodiment of the present invention sets forth a technique for performing face swapping. The technique includes generating a latent representation of a first facial identity included in an input image. The technique further includes identifying a first identity-specific neural network layer associated with a second facial identity from a plurality of identity-specific neural network layers, wherein each neural network layer included in the plurality of identity-specific neural network layers is associated with a different facial identity. The technique further includes executing the first identity-specific neural network layer and one or more other neural network layers to generate one or more decoder input values corresponding to the latent representation. The technique further includes executing a decoder neural network that converts the one or more decoder input values into an output image depicting the second facial identity.

19 Claims, 9 Drawing Sheets

(51) Int. Cl.
*G06V 10/82* (2022.01)
*G06V 40/16* (2022.01)

(56) References Cited

U.S. PATENT DOCUMENTS

| | | | | |
|---|---|---|---|---|
| 11,068,746 B2* | 7/2021 | Bala | ................... | G06F 18/2148 |
| 11,222,466 B1* | 1/2022 | Naruniec | ............... | G06N 3/088 |
| 11,308,657 B1* | 4/2022 | Berlin | ...................... | G06T 5/77 |
| 11,526,626 B2* | 12/2022 | Kuta | ........................ | G06V 10/82 |
| 12,111,880 B2* | 10/2024 | Naruniec | ............... | G06N 3/088 |
| 2020/0372621 A1* | 11/2020 | Naruniec | ................. | G06N 3/04 |

OTHER PUBLICATIONS

Chang et al., "PairedCycleGAN: Asymmetric Style Transfer for Applying and Removing Makeup", IEEE/CVF Conference on Computer Vision and Pattern Recognition, DOI 10.1109/CVPR.2018.00012, 2018, pp. 40-48.

Chen et al., "SimSwap: An Efficient Framework For High Fidelity Face Swapping", Deep Learning for Multimedia, Association for Computing Machinery, https://doi.org/10.1145/3394171.3413630, Oct. 12-16, 2020, pp. 2003-2011.

Dolhansky et al., "The DeepFake Detection Challenge (DFDC) Dataset", arXiv:2006.07397, Oct. 28, 2020, pp. 1-13.

Dong et al., "Unsupervised Image-to-Image Translation with Generative Adversarial Networks", arXiv:1701.02676, Jan. 10, 2017, 5 pages.

Gal et al., "SWAGAN: A Style-based WAvelet-driven Generative Model", arXiv:2102.06108, Feb. 11, 2021, pp. 1-13.

Huang et al., "Arbitrary Style Transfer in Real-time with Adaptive Instance Normalization", arXiv:1703.06868, Jul. 30, 2017, pp. 1-11.

Karras et al., "Progressive Growing of GANs for Improved Quality, Stability, and Variation", arXiv:1710.10196, ICLR, Feb. 26, 2018, pp. 1-26.

Karras et al., "Analyzing and Improving the Image Quality of StyleGAN", arXiv:1912.04958, Mar. 23, 2020, pp. 1-21.

Naruniec et al., "High-Resolution Neural Face Swapping for Visual Effects", vol. 39, No. 4, Computer Graphics Forum, DOI: 10.1111/cgf.14062, 2020, pp. 173-184.

Nirkin et al., "FSGAN: Subject Agnostic Face Swapping and Reenactment", arXiv:1908.05932, Aug. 16, 2019, 16 pages.

Nirkin et al., "FSGANv2: Improved Subject Agnostic Face Swapping and Reenactment", arXiv:2202.12972, Feb. 25, 2022, pp. 1-17.

Petrov et al., "DeepFaceLab: A Simple, Flexible And Extensible Face Swapping Framework", arXiv:2005.05535, May 12, 2020, pp. 1-17.

Verdoliva, Luisa, "Media Forensics and DeepFakes: an overview", arXiv:2001.06564, Jan. 18, 2020, pp. 1-24.

Xu et al., "Region-Aware Face Swapping", arXiv:2203.04564, Mar. 18, 2022, 11 pages.

Xu et al., "High-resolution Face Swapping via Latent Semantics Disentanglement", arXiv:2203.15958, Mar. 30, 2022, 12 pages.

Yu et al., "BiSeNet: Bilateral Segmentation Network for Real-time Semantic Segmentation", arXiv:1808.00897, Aug. 2, 2018, pp. 1-17.

Zhu et al., "One Shot Face Swapping on Megapixels", arXiv:2105.04932, May 11, 2021, 11 pages.

* cited by examiner

GENERATING AN IMAGE INCLUDING A SOURCE INDIVIDUAL

CROSS-REFERENCE TO RELATED APPLICATIONS

This application claims priority benefit of the U.S. Provisional Patent Application titled, "TECHNIQUES FOR GENERATING AN IMAGE INCLUDING A SOURCE INDIVIDUAL," filed on May 19, 2022, and having Ser. No. 63/343,944. The subject matter of this related application is hereby incorporated herein by reference.

BACKGROUND

Field of the Various Embodiments

Embodiments of the present disclosure relate generally to machine learning and computer vision and, more specifically, to techniques for generating an image including a source individual.

Description of the Related Art

Face swapping refers to the changing of the facial identity of an individual in standalone images or video frames while maintaining the performance of the individual within the standalone images or video frames. This facial identity includes aspects of a facial appearance that arise from differences in personal identities, ages, eye colors, and/or other factors. For example, two different facial identities may be attributed to two different individuals, the same individual under different lighting conditions, and/or the same individual at different ages. Further, the performance of an individual, which also is referred to as the dynamic behavior of an individual, includes the facial expressions and poses of the individual, as depicted in the video frames or in standalone images.

Face swapping can be conducted under various types of scenarios. For example, the facial identity of an actor within a given scene of video content (e.g., a film, a show, etc.) could be changed to a different facial identify of the same actor at a younger age or at an older age. In another example, a first actor could be unavailable for a video shoot because of scheduling conflicts, because the first actor is deceased, and/or for other reasons. To incorporate the likeness of the first actor into video content generated during the shoot, footage of a second actor could be captured during the shoot, and the face of the second actor in the footage could be replaced with the face of the first actor afterwards.

Various machine learning models have been developed to perform face swapping by altering an image of a target individual such that a face of a source individual replaces the face of the target individual in the image. The quality of the image resulting from the face swapping is based on the persuasiveness with which the image appears to depict the source individual instead of the target individual and/or the absence of visual artifacts that would reduce the persuasiveness. Also, the selection and configuration of the machine learning model can affect the speed, difficulty, and computational complexity of training the machine learning model to perform face swapping, and the range of individuals and faces for which of the machine learning model can perform face swapping.

Existing face swapping techniques use machine learning models that have numerous parameters and thus consume large amounts of memory. For example, a machine learning model can be trained on the facial identities of a set of individuals. Any of the facial identities can then be used as the face of a source individual for replacing the face of a target individual in a given input image. However, in the trained model, each of the facial identities can consume on the order of 100 megabytes of memory. Thus, the size of the model can increase in proportion to the number of facial identities on which the model is trained, and the increase can be by a substantial amount of memory for each additional image. Another drawback of existing face swapping techniques is that changing the identity involves exchanging a significant part of the model. Because of the significant amount of data exchanged when the identity is changed, mixing of different identities in one training batch is infeasible using existing techniques.

What is needed in the art are more effective and efficient techniques for changing facial identifies in video frames and images.

SUMMARY

One embodiment of the present invention sets forth a technique for performing face swapping. The technique includes converting an input image of a first facial identity into a latent representation. The technique further includes selecting an identity-specific dense neural network layer based on a second facial identity. The technique also includes executing the selected identity-specific dense neural network layer to convert the latent representation into one or more latent-space values. The technique further includes executing a set of decoder input generator dense layers that determine one or more sets of decoder input values based on the latent-space values. The technique also includes executing a decoder neural network that converts the one or more sets of decoder input values into an output image depicting the second facial identity.

One technical advantage of the disclosed techniques relative to the prior art is that the machine learning models used in the disclosed techniques are substantially more memory efficient. For each additional identity on which the model is trained using the disclosed techniques, the size of the machine learning model increases by a much smaller amount than in prior art techniques. Instead of adding a set of neural network layers for each additional identity, for example, the disclosed techniques can add a single network layer in some embodiments, or a single one-hot encoded identity vector in other embodiments. Accordingly, in comparison with prior art techniques, the size of the machine learning model used by the disclosed techniques is largely independent of the number of identities being trained. Another technical advantage of the disclosed techniques is the ability to switch between identities in the machine learning model by changing a single network layer in some embodiments, or by changing the values in a one-hot encoded identity vector in other embodiments. Thus, the disclosed techniques can switch between identities more efficiently than previous techniques that involved changing a set of neural network layers when switching between identities. Further, the disclosed techniques can be used to train the machine learning model with multiple identities in one batch. Such training with multiple identities in a batch tends to provide enhanced face swapping quality and enhanced generalization capabilities. Because of the relatively small amount of data exchanged when the identity is changed, different identities can be included in a training batch. For example, using prior techniques, training a model on a batch of 8 images from 8 different identities would involve backpropagation through 8 decoders because there would be one decoder per identity. In the disclosed techniques, training on a batch of 8 images from 8 different identities involves backpropagating through 8 dense layers, and 1 decoder. Since the dense layer is substantially smaller than the decoder, the number of model parameters in memory is substantially reduced in the disclosed techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
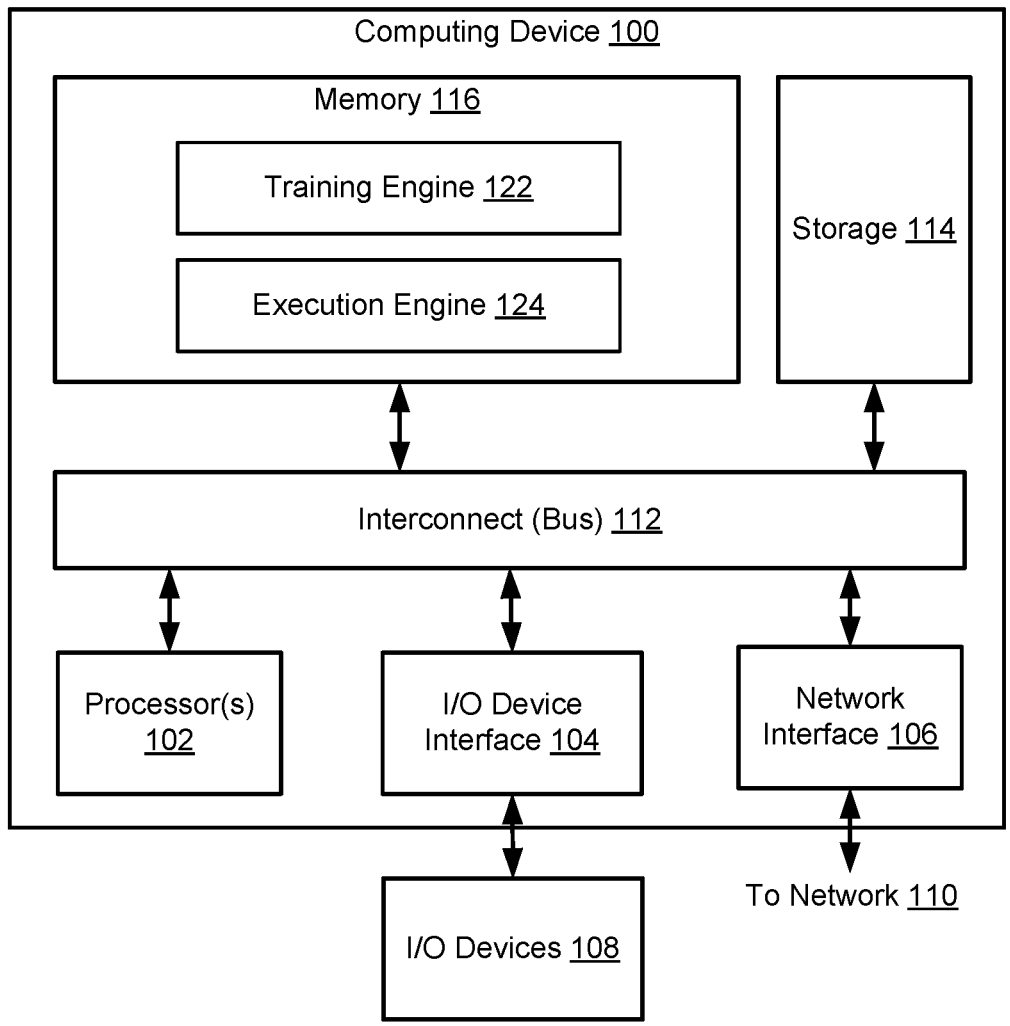
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100. In another example, training engine 122 and/or execution engine 124 could execute on various sets of hardware, types of devices, or environments to adapt training engine 122 and/or execution engine 124 to different use cases or applications. In a third example, training engine 122 and execution engine could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains one or more machine learning models to perform face swapping, in which the facial identity of an individual in one or more images or video frames is changed while maintaining the performance of the individual within the image(s) or video frame(s). Execution engine 124 executes the machine learning model(s) to convert input images that include certain facial identities and performances into output images that include different facial identities and the same performances.

More specifically, training engine 122 and execution engine 124 are configured to train and execute a machine learning model that performs face swapping using memory-efficient representations of facial identity. In some embodiments, facial identity is represented in a machine learning model by a selected identity-specific dense layer that converts a latent representation to latent space values for input to decoder input generator dense layers. The decoder input values are then provided as input to a decoder. In other embodiments, facial identity is represented in a machine learning model by a one-hot vector that is combined with decoder input values. The one-hot vector specifies which facial identity is to be used, and a combination of the one-hot vector and decoder input values is provided as input to a decoder. The decoder changes the facial identity of an individual in an input image or video frames to the specified facial identity while maintaining the performance of the individual in the input image or video frames.

Face Swapping Using Memory-Efficient Identity Representations

Figure 2A:
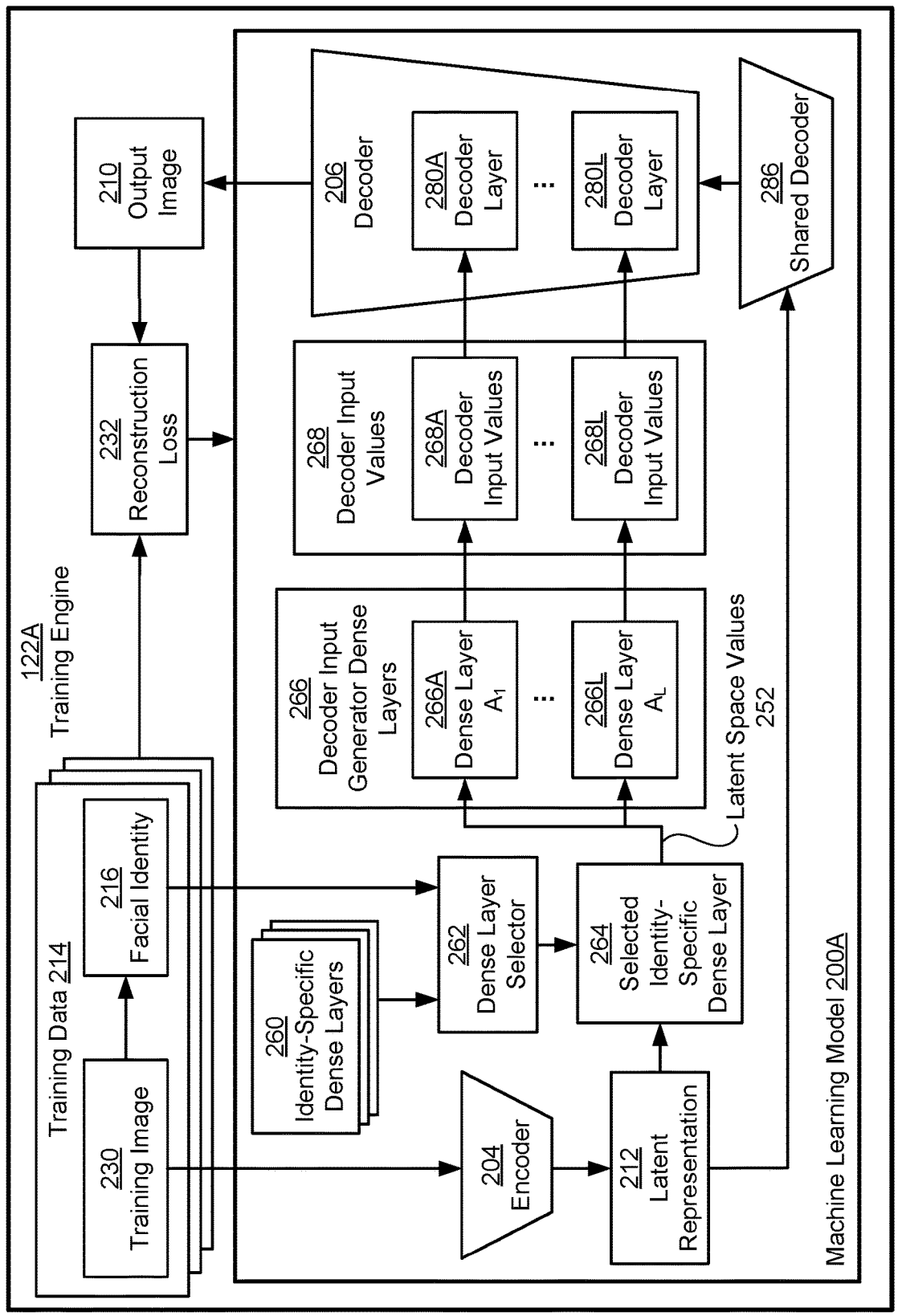
FIG. 2A illustrates a training engine in which facial identity is represented by a selected identity-specific dense layer that converts a latent representation to latent space values for input to decoder input generator dense layers, according to various embodiments.

FIG. 2A illustrates a training engine 122A in which facial identity 216 is represented by a selected identity-specific dense layer 264 that converts a latent representation 212 to latent space values 252 for input to decoder input generator dense layers 266, according to various embodiments. As such, FIG. 2A is a more detailed illustration of the training engine 122 of FIG. 1. As mentioned above, training engine 122A operates to train a machine learning model 200A to perform face swapping. In machine learning model 200A, facial identities are represented as identity-specific dense layers 260. During operation of the machine learning model 200A, an individual facial identity 216 is represented as a selected identity-specific dense layer 264.

As shown in FIG. 2A, machine learning model 200A includes, without limitation, an encoder 204, a latent representation 212, one or more identity-specific dense layers 260, a dense layer selector 262, a selected identity-specific dense layer 264, decoder input generator dense layers 266, decoder input values 268 generated by the decoder input generator dense layers 266, a shared decoder 286, and a decoder 206. A training image 230 can be provided as input to the encoder 204. Each training image 230 depicts a scene including a face. In response to receiving the training image 230, the machine learning model 200A generates an output image 210. The training engine 122A trains the machine learning model 200A to generate an output image 210 depicting a facial identity that resembles a facial identity depicted in the training image 230.

In one or more embodiments, machine learning model 200A is an autoencoder that includes encoder 204 and decoder 206. Encoder 204 includes convolutional layers, residual neural network (ResNet) layers, and/or other types of neural network layers that convert a 2D image 222 that depicts facial identity 250 into a corresponding latent representation 224. This latent representation 224 includes a fixed-length vector representation of the visual attributes in image 222 in a lower-dimensional space.

In operation, the encoder 204 generates a latent representation 212 of a training image 230, a selected identity-specific dense layer 264 converts the latent representation 212 to latent space values 252, decoder input generator dense layers 266 convert the latent space values 252 to decoder input values 268, and a decoder 206 converts the decoder input values 268 to an output image 210. A shared decoder 286 can provide the latent representation 212 as input to the decoder 206. The shared decoder 286, if present, is not influenced by the identity and thus decodes identity-free information about the pose and expression. Further, the shared decoder 286, can reshape and decode the image up to a specified image resolution. Alternatively, the decoder 206 can reshape and decode the image up to the specified image resolution, in which case the shared decoder 286 can be omitted. The latent representation 212 can be, for example, a vector of 1024 elements, or a vector of other suitable size. The term "dense layer" as used herein refers to a densely connected neural network layer. The selected identity-specific dense layer 264, decoder input generator dense layers 266, and decoder layers 280 are examples of dense layers. The identity-specific dense layers 260 can include adaptive instance normalization (AdaIN) coefficients that represent facial identity 216. The decoder input values 268 can include (AdaIN) coefficients. The decoder input values 268 can also, or instead, include weights associated with neurons within the layer(s) of decoder 206. The AdaIN coefficients and/or weights can be used to modify convolutional operations performed by the layer(s) 280 in decoder 206, thereby allowing decoder 206 to generate images 210 with different facial identities.

The output image 210 depicts a facial identity generated by the decoder 206 based on the decoder input values 268. The selected identity-specific dense layer 264 represents a facial identity 216 and is selected, by a dense layer selector 262, from a set of identity-specific dense layers 260 based on the facial identity 216. Each of the identity-specific dense layers 260 corresponds to a different facial identity 216. For example, each of the identity-specific dense layers 260 can correspond to a facial identity 216 specified in training data 214. In some embodiments, the selected identity-specific dense layer can include dense layers for two or more identities, or two or more identity-specific dense layers can be selected, each for a different identity. Multiple identities can be selected in this way to, for example, interpolate between two individuals.

The facial identity depicted in the output image 210 corresponds to the facial identity 216 represented by the selected identity-specific dense layer 264. The facial identity depicted in the output image 210 can be changed by changing the identity-specific dense layer 264. Changing the selected identity-specific dense layer 264 can involve replacing a previously-selected selected identity-specific dense layer 264. The dense layer selector 262 can replace the previously-selected selected identity-specific dense layer 264 with a newly-selected selected identity-specific dense layer 264. The newly-selected selected identity-specific dense layer 264 can be one of the identity-specific dense layers 260 that corresponds to a given facial identity 216.

The dense layer selector 262 can replace the selected identity-specific dense layer 264 with the newly-selected selected identity-specific dense layer 264. Replacing the previously-selected identity-specific dense layer 264 with the newly-selected identity-specific dense layer 264 reduces the amount of memory 116 used by machine learning model 200A as compared to retaining multiple identity-specific dense layers 260 in memory 116. Since the previously-selected identity-specific dense layer 264 is replaced and not used for processing the newly-selected identity, the selected identity-specific dense layer 264 can be removed from memory 116 and the portion of memory 116 allocated to it can be de-allocated and made available for other uses. Replacing the previously-selected layer 264 with the newly-selected later 264 can also enable training based on multiple identities in one batch, as described above.

The machine learning model 200A can operate with one of the identity-specific dense layers 260 in memory 116 while the other identity-specific dense layers 260 are not in memory 116. For example, the other identity-specific dense layers 260 can be stored in persistent storage 114 and loaded from persistent storage 114 into memory 116 when selected by dense layer selector 262. The dense layer selector 262 can store each of the trained identity-specific dense layers 264 as one of the identity-specific dense layers 260 persistent storage 114 during training. Each of the identity-specific dense layers 260 can be stored in persistent storage 114 in association with an identifier of the facial identity 216 associated with the respective identity-specific dense layer 260. The dense layer selector 262 can retrieve the selected identity-specific dense layer 264 associated with the facial identity 216 from persistent storage using the facial identity 216 as query criteria. For example, the dense layer selector 262 can search the identity-specific dense layers 260 stored in persistent storage 114 for a dense layer having an associated identity that matches the facial identity 216.

The dense layer selector 262 can cause the machine learning model 200A to use the newly-selected identity-specific dense layer 260. For example, the dense layer selector 262 can configure the selected identity-specific dense layer 264 to reference the identified one of the dense layer selector 262. Alternatively or additionally, the dense layer selector 262 can configure the machine learning model 200A to provide the latent representation 212 to the identified identity-specific dense layer 260, and further configure the machine learning model 200A to provide the latent space values 252 generated by the identified identity-specific dense layer 264 to the decoder input generator dense layers 266. The latent space values 252 can be a vector generated by the identity-specific dense layer 264. The vector can be provided to each of the sense layers 266A-266L. Although the dense layer selector 262 replaces the selected identity-specific dense layer 264 using specific techniques in the examples described herein, any suitable technique can be used to change the selected identity-specific dense layer 264 to one of the identity-specific dense layers 260.

In some embodiments, each training image 230 includes a normalized image of a face associated with facial identity 250. This face can include (but is not limited to) a human face, an animal face, an animated face, a computer-generated face, and/or another representation of a region of a head that can be used to uniquely identify a human or non-human individual. Within the normalized image, landmarks or features of the face are aligned to match landmarks of a generic face with a neutral expression. As a result, facial features (e.g., eyes, ears, nose, etc.) are at similar locations across the normalized images. The normalized image can also be cropped to a predefined size. To generate the normalized image, training engine 122 and/or execution engine 124 can rotate, scale, translate, crop, and/or otherwise process an original "non-normalized" image, such as an image of the face captured by a camera. Training engine 122 and/or execution engine 124 can also, or instead, use a deep alignment network (DAN) (or another technique or machine learning model) to detect the largest face in each training image 230 or input image 222 and determine the locations of facial landmarks in the largest face. Training engine 122 and/or execution engine 124 can then rotate, translate, crop, scale, perform color augmentation, and/or otherwise transform or process the image so that the eyes of the largest face lie on a predefined horizontal line and have a predefined ocular distance.

Input into decoder 206 includes latent representation 224 from encoder 204 and a representation of a facial identity 216 depicted in training image 230. Given the decoder input generator dense layers 266 generated from this input, convolutional layers, ResNet block layers, and/or other types of neural network layers in decoder 206 generate an output image 210 that includes the facial identity 216 (e.g., personal identity, age, lighting conditions, etc.) while retaining the performance (e.g., behavior, facial expression, pose, etc.) from the training image 230. The selected identity-specific dense layer 264 can include one or more convolutional layers, one or more ResNet block layers, and/or other types of neural network layers that generate latent space values 252 based on the latent representation 212. The decoder input generator dense layers 266 can also include convolutional layers, ResNet block layers, and/or other types of neural network layers that generate decoder input values 268 based on the latent space values 252.

The selected identity-specific dense layer 264 provides latent space values 252 to each of the decoder input generator dense layers 266. The decoder input generator dense layers 266 include a first dense layer 266A ("$A_1$") and a second dense layer 266L ("$A_L$"). The first dense layer 266A ("$A_1$") generates one or more first decoder input values 268A, which are provided as input to a first decoder layer 280A. The second dense layer 266L ("$A_L$") generates one or more second decoder input values 268L, which are provided as input to a third decoder layer 280L. Although two decoder input generator dense layers 266, two sets of decoder input values 268, and two decoder layers 280 are shown, any suitable number of dense layers 266, sets of decoder input generator dense layers 266, and decoder layers 280 can be used in machine learning model 200A.

Training engine 122 trains machine learning model 200 using training data 214 that includes training images 230 associated with multiple facial identities 216. Each training image 230 depicts a face. Each set of training images 230 also, or instead, includes a rendered image (e.g., computer-generated image) of a face. In some embodiments, training images 230 include a video stream that depicts or captures the face. Training images 230 can additionally include normalized images of the corresponding faces. As described above, these normalized images can be cropped and/or resized to have a certain resolution. These normalized images can also include eyes, noses, and/or other facial features or landmarks at similar locations.

Training engine 122A trains the machine learning model 200A based on training data 214, which includes a set of training images 230 and respective facial identities 216. Each of the training images 230 is associated with a corresponding facial identity 216. The training engine 122A provides each training image 230 to the encoder 204 and provides each corresponding facial identity 216 to the dense layer selector 262.

When training the machine learning model 200A, for each pair of a training image 230 and facial identity 216, the dense layer selector 262 selects one of the identity-specific dense layers 260 that corresponds to the facial identity 216 associated with the training image 230 according to the training data 214. The machine learning model 200A generates an output image 210, and the training engine 122A determines an amount of reconstruction loss 232 between the training image 230 and the output image 210. The reconstruction loss 232 can be determined using a loss function. The training engine 122A updates the machine learning model 200A based on the amount of reconstruction loss 232 using backpropagation or other appropriate training technique. The training engine 122A jointly trains the encoder 204, the selected identity-specific dense layer 264, the generator dense layers 266, and the decoder layers 280 of the decoder 206. In various embodiments, encoder 204, identity-specific dense layers 260 (including selected identity-specific dense layer 264), decoder input generator dense layers 266, and decoder 206 are implemented as neural networks.

For example, training engine 122A can perform a forward pass that uses machine learning model 200A to convert a batch of training images 230 into corresponding training latent representations 212, uses dense layer selector 262 to select identity-specific dense layers 264 that represent the respective facial identities 216 associated with the training images 230, generates decoder input values 268 based on output of the identity-specific dense layers 264, and uses one or more instances of decoder 206 to convert training latent representations 212 into output images 210 based on the decoder input values 268.

Training engine 122 can compute a mean squared error (MSE), L1 loss, and/or another type of reconstruction loss 232 that measures the differences between a training image 230 and output image 210 that corresponds to a reconstruction of training images 230. Training engine 122 could then perform a backward pass that backpropagates reconstruction loss 232 across layers of machine learning model 200 and uses stochastic gradient descent to update parameters (e.g., neural network weights) of machine learning model 200 based on the negative gradients of the backpropagated reconstruction loss 232. Training engine 122 can repeat the forward and backward passes with different batches of training data 214 and/or over a number of training epochs and/or iterations until reconstruction loss 232 falls below a threshold and/or another condition is met. By training machine learning model 200 in a way that minimizes reconstruction loss 232, training engine 122 generates a trained encoder 204 that learns lower-dimensional latent representations 224 of training images 230. Training engine 122 also generates one or more identity-specific dense layers 260, each corresponding to a facial identity 216.

While the training of machine learning model 200 using reconstruction loss 232 has been described above with respect to training images 230, it will be appreciated that machine learning model 200 can also, or instead, be trained using reconstruction loss 232 to reproduce other types of images. For example, training engine 122 can train machine learning model 200 in a way that minimizes reconstruction loss 232 between individual still images of faces, individual video streams of faces, and/or other types of images inputted into machine learning model 200 and reconstructions of these images outputted by machine learning model 200.

Figure 2B:
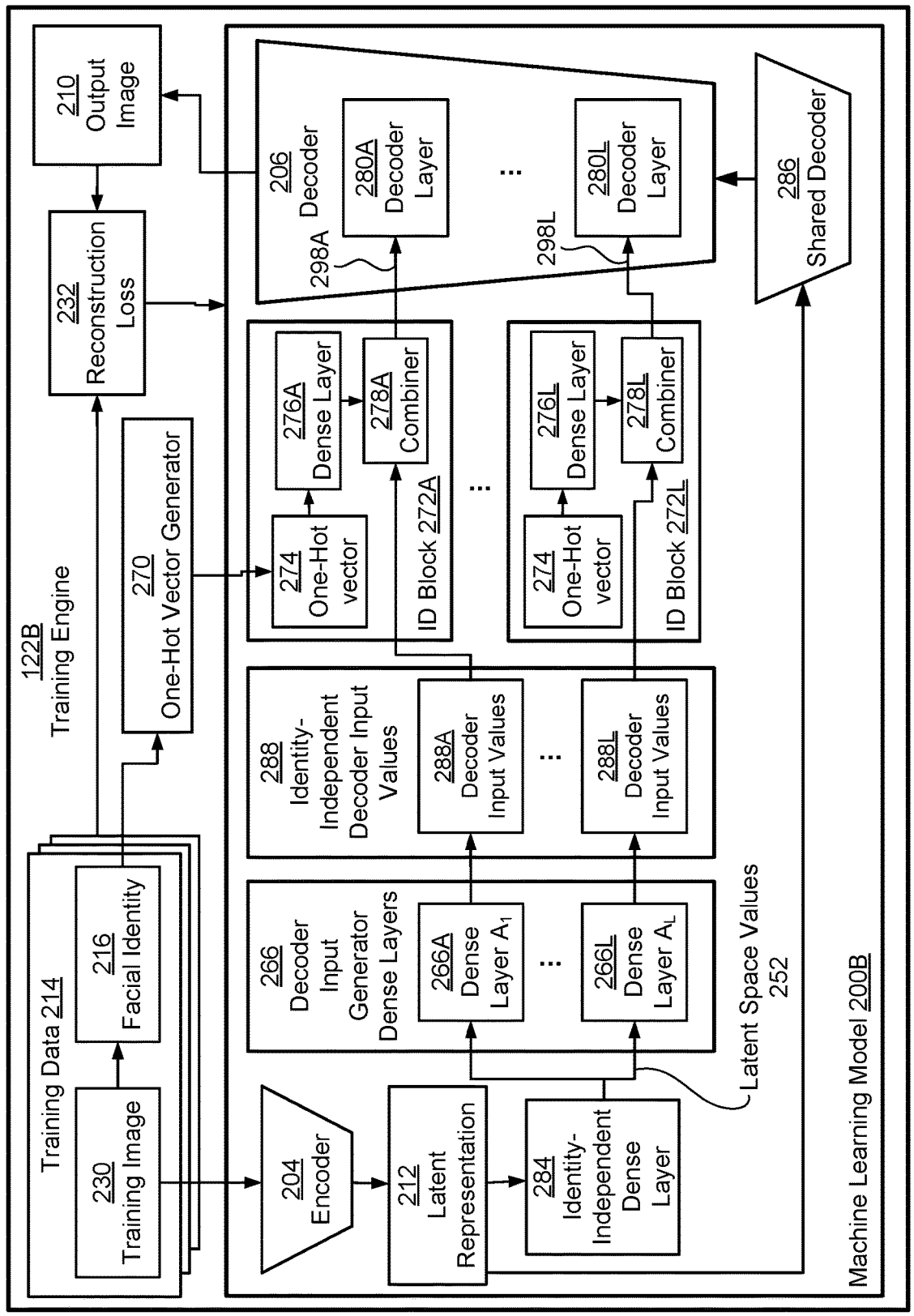
FIG. 2B illustrates a training engine in which facial identity is represented by a one-hot vector that is combined with decoder input values, according to various embodiments.

FIG. 2B illustrates a training engine 122B in which facial identity 216 is represented by a one-hot encoded identity vector 274 ("one-hot vector") that is combined with decoder input values 268, according to various embodiments. As such, FIG. 2B is a more detailed description of the training engine 122 of FIG. 1. The training engine 122B operates to train a machine learning model 200B to perform face swapping. In machine learning model 200B, facial identities are represented as one-hot vectors 274. Thus, each one-hot vector 274 is identity-specific. During operation of the machine learning model 200B, the facial identity to be included in an output image 210 is specified by a one-hot vector 274. The training engine 122B trains the machine learning model 200B based on reconstruction loss 232 between training images 230 and output images 210 as described above with respect to FIG. 2A, but, during training, the machine learning model 200B generates the output image 210 based on a facial identity 216 represented by a one-hot vector 274. The one-hot vector 274 can be, for example, a vector of 512 elements, or a vector other suitable size.

The one-hot vector 274 is generated by one-hot vector generator 270 based on the facial identity 216. Thus, different one-hot vectors 274 correspond to different facial identities 216. The one-hot vector 274 can be a one-one-hot vector in which one designated bit is '1' and the other bits are each '0'. Alternatively, the one-hot vector 274 can be a multi-hot vector in which two or more designated bits are each '1' and the other bits are each '0'. Although the one-hot encoded identity vector 274 is used in the examples described here, any encoded identity vector that contains a value that corresponds to an identity can be used, including encoded identity vectors that have two or more '1' values ("multi-hot" vectors). Setting two or more bits of the one-hot vector 274 causes the model 200 to perform facial identity interpolation. If the one-hot vector 274 includes two or more bits each having the value '1', the selected identity-specific dense layer can include dense layers for two or more identities that correspond to the positions of the two or more '1' bits in the one-hot vector 274. Multiple identities can be selected in this way to, for example, interpolate between two individuals. The selected identity-specific dense layer 264 (e.g., identity vector) can be averaged for two facial identities to generate a mixture of the two facial identities. The two facial identities can be the same person at different ages, for example, to achieve an age between the ages of the two identities. In another example, two or more identities can be averaged to generate facial identity of a new person that is the average of two or more different people.

As another alternative, the designated bit(s) in the one-hot vector 274 can each be '0', in which case the other bits are each '1'. For example, each particular one-hot vector 274 can correspond to a particular facial identity 216 specified in training data 214. The one-hot vector 274 can include an element for each facial identity 216, and the element corresponding to the facial identity 216 represented by the one-hot vector 274 has a different value from the other elements of the vector. For example, the element corresponding to the particular facial identity 216 represented by a one-hot vector 274 has a value of 1, and each of the elements corresponding to other facial identities 216 has a value of 0. Although the values 1 and 0 are used in the examples herein, any suitable values can be used. As an example, a vector having five elements can represent a particular facial identity selected from a set of five facial identities. A one-hot vector [1, 0, 0, 0, 0] represents a first facial identity (e.g., a facial identity value="1"), a one-hot vector [0, 1, 0, 0, 0] represents a second facial identity (e.g., a facial identity value="2"), and a one-hot vector [0, 0, 0, 0, 1] represents a fifth facial identity (e.g., a facial identity value="5"), for example. A one-hot vector generator 270 converts a facial identity 216 (e.g., a facial identity value) to a one-hot vector 274. For example, one-hot vector generator 270 can convert a facial identity value="2" to the one-hot vector [0, 1, 0, 0, 0].

As shown in FIG. 2B, machine learning model 200B includes an encoder 204, a latent representation 212, an identity-independent dense layer 284, decoder input generator dense layers 266, decoder input values 268, identity-specific processing blocks 272, and a decoder 206. In response to receiving the training image 230, the machine learning model 200B generates an output image 210. The training engine 122B trains the machine learning model 200B to generate an output image 210 depicting a facial identity that resembles a facial identity depicted in the training image 230.

In operation, the encoder 204 generates a latent representation 212 of a training image 230, an identity-independent dense layer 284 converts the latent representation 212 to latent space values 252, decoder input generator dense layers 266 convert the latent space values 252 to identity-independent decoder input values 288, identity-specific processing blocks 272 convert the identity-independent decoder input values 288 to identity-specific decoder input values 298, and a decoder 206 converts the identity-specific decoder input values 298 to an output image 210.

The decoder input generator dense layers 266 include a first dense layer 266A ("$A_1$") and a second dense layer 266L ("$A_L$"). The first dense layer 266A ("$A_1$") generates one or more first identity-independent decoder input values 288A, which are provided as input to a first identity-specific processing block 272A. The first identity-specific processing block 272A generates first identity-specific decoder input values 298A, which are provided to a first decoder layer 280A.

The second dense layer 266L ("$A_L$") generates one or more second identity-independent decoder input values 288L, which are provided as input to a second identity-specific processing block 272L. The second identity-specific processing block 272L generates second identity-specific decoder input values 298L, which are provided to a second decoder layer 280L. Although three decoder input generator dense layers 266, three sets of decoder input values 288, three identity-specific processing block 272, and three decoder layers 280 are shown, any suitable number of decoder input generator dense layers 266, sets of identity-independent decoder input values 288, identity-specific processing blocks 272, and decoder layers 280 can be used in machine learning model 200B.

The identity-specific processing blocks 272 combine the one-hot vector 274 with the identity-independent decoder input values 288 to determine identity-specific decoder input values 298, which are provided to decoder 206. Each identity-specific processing block 272 includes a one-hot vector processing dense layer 276 that converts the one-hot vector 274 to values suitable for combining with a set of identity-independent decoder input values 288. A first identity-specific processing block 272A includes a first one-hot vector processing dense layer 276A and a first combiner 278A. The first one-hot vector processing dense layer 276A converts the one-hot vector 274 to one or more first values based on the one-hot vector 274, and the first combiner 278A combines the first values with the first identity-independent decoder input values 288A to determine first identity-specific decoder input values 298A. The first identity-specific decoder input values 298A are provided to a first decoder layer 280A.

A second identity-specific processing block 272L includes a second one-hot vector processing dense layer 276L and a second combiner 278L. The second dense layer 276L converts the one-hot vector 274 to one or more second values based on the one-hot vector 274, and the second combiner 278L combines the second values with the second identity-independent decoder input values 288L to determine second identity-specific decoder input values 298L. The second identity-specific decoder input values 298L are provided to a second decoder layer 280L.

As an example, the first identity-independent decoder input values 288A can include two values named a and b. The values a and b can be, for example, AdaIn coefficients. One-hot vector processing dense layer 276A converts a one-hot vector such as [1, 0, 0, 0, 0] to two values, named c and d, which can be combined with the identity-independent decoder input values 288A. Combiner 278A combines each of the decoder input values 288A with a respective value from dense layer 276A. For example, combiner 278A can add each of the decoder input values 288A to the respective value from one-hot vector processing dense layer 276A. The resulting two identity-specific decoder input values 298A are a+c and b+d. As another example, combiner 278A can multiply each of the decoder input values 288A by the respective value from one-hot vector processing dense layer 276A to produce the identity-specific decoder input values 298A. The resulting two identity-specific decoder input values 298A provided decoder layer 280A are a*c and b*d.

The decoder 206 generates an output image 210 based on the identity-specific decoder input values 298 using the decoder layers 280. The output image 210 depicts a facial identity that corresponds to the one-hot vector 274. The facial identity depicted in the output image 210 can be changed by changing the one-hot vector 274. The one-hot vector generator 270 changes the one-hot vector 274 based on a selected facial identity 216. The one-hot vector generator 270 can thus cause the machine learning model 200B to use a particular facial identity 216 to generate the output image 210. Although the one-hot vector generator 270 generates the one-hot vector 274 from the facial identity 216 in the examples described herein, any suitable technique can be used to generate the one-hot vector 274 based on the facial identity 216.

Similarly to the training engine 122A described herein with respect to FIG. 2A, the training engine 122B trains the machine learning model 200B based on training data 214, which includes a set of training images 230 and respective facial identities 216. Each of the training images 230 is associated with a corresponding facial identity 216. The training engine 122B provides each training image 230 to the encoder 204 and provides each corresponding facial identity 216 to the one-hot vector generator 270.

When training the machine learning model 200B, for each pair of a training image 230 and facial identity 216, the one-hot vector generator 270 generates a one-hot vector 274 that corresponds to the facial identity 216 associated with the training image 230 according to the training data 214. The machine learning model 200B generates an output image 210, and the training engine 1228 determines an amount of reconstruction loss 232 between the training image 230 and the output image 210. The reconstruction loss 232 can be determined using a loss function. The training engine 1228 updates the machine learning model 200B based on the amount of reconstruction loss 232 using backpropagation or other appropriate training technique. The training engine 1228 jointly trains the encoder 204, the identity-independent dense layer 284, the generator dense layers 266, the one-hot vector processing dense layers 276, and the decoder layers 280 of the decoder 206. In various embodiments, encoder 204, identity-independent dense layer 284, decoder input generator dense layers 266, one-hot vector processing dense layers 276, and decoder 206 are implemented as neural networks.

For example, training engine 122B can perform a forward pass that uses machine learning model 200B to convert a batch of training images 230 into corresponding training latent representations 212, uses an identity-independent dense layer 284 to generate latent space values 252 based on the latent representations 212, uses decoder input generator dense layers 266 to generate identity-independent decoder input values 288 based in the latent space values 252. Training engine 1228 further uses the one-hot vector generator 270 to generate identity-specific one-hot vectors 274 that represent the respective facial identities 216 associated with the training images 230. Training engine 1228 then combines the identity-independent decoder input values 288 with the one-hot vector 274 to generate identity-specific decoder input values 298, which are provided as input to decoder layers 280 of the decoder 206. Training engine 122B then uses the decoder 206 to convert the identity-specific decoder input values 298 into output images 210 and computes a reconstruction loss 232 that measures a difference between the output image 210 and the training image 230.

Training engine 122 can then perform a backward pass that backpropagates reconstruction loss 232 across layers of machine learning model 200B and uses stochastic gradient descent to update parameters (e.g., neural network weights) of machine learning model 200B based on the negative gradients of the backpropagated reconstruction loss 232. Training engine 122 can repeat the forward and backward passes with different batches of training data 214 and/or over a number of training epochs and/or iterations until reconstruction loss 232 falls below a threshold and/or another condition is met.

Figure 3A:
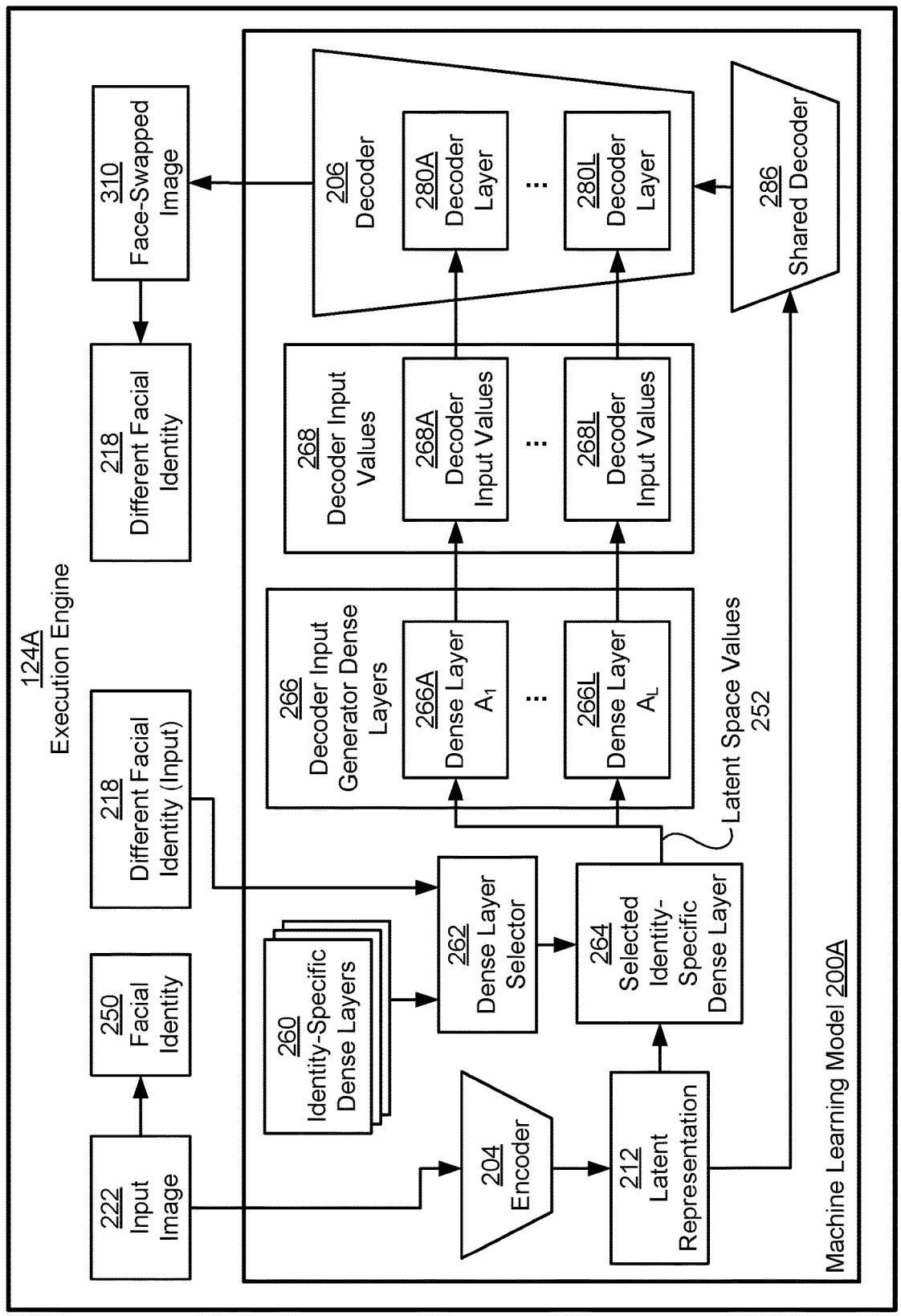
FIG. 3A illustrates an execution engine in which facial identity is represented by a selected identity-specific dense layer that converts a latent representation to latent space values for input to decoder input generator dense layers, according to various embodiments.

FIG. 3A illustrates an execution engine 124A in which facial identity 250 is represented by a selected identity-specific dense layer 264 that converts a latent representation 212 to latent space values 252 for input to decoder input generator dense layers 266, according to various embodiments. As such, FIG. 3A is a more detailed description of execution engine 124 of FIG. 1. Execution engine 124A uses the trained machine learning model 200A to change a facial identity 250 that is captured in or otherwise depicted in an input image 222 to a different facial identity 218, thereby generating a face-swapped image 310 that depicts the different facial identity 218.

Execution engine 124A uses a trained machine learning model 200A to convert an input image 222 depicting a certain facial identity 250 and a certain performance (e.g., behavior, facial expression, pose, etc.) into a face-swapped image 310 depicting a different facial identity 218 and the same performance. More specifically, execution engine 124A receives an input image 222 of a face with a certain facial identity 250. The different facial identity 218 can be specified as an input to machine learning model 200A. The different facial identity 218 can be specified as, for example, an identifier that corresponds to one of a set of identity-specific dense layers 260 generated during training of the machine learning model 200A. Machine learning model 200A includes a dense layer selector 262 that selects an identity-specific dense layer 264 that corresponds to the different facial identity 218 from the set of identity-specific dense layers 260. The selected identity-specific dense layer 264 represents the different facial identity 218 to be depicted in the face-swapped image 310. Machine learning model 200A uses the selected identity-specific dense layer 264 to generate a face-swapped image 310 using decoder 206, as described above with respect to FIG. 2A.

In one or more embodiments, face-swapped image 310 with a different facial identity 218 from facial identity 250 depicted in a corresponding input image 222 is used as content in an immersive environment, such as (but not limited to) a virtual reality (VR), augmented reality (AR), and/or mixed reality (MR) environment. This content can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

For example, an image 222 (or video frame) can be rendered from a 3D model or scene and/or generated from an image (or video frame) using a 2D to 3D conversion technique. Images 222 can depict a person, avatar, and/or another real or synthetic individual associated with facial identity 250. Execution engine 124 can use machine learning model 200 to replace facial identity 250 depicted in an image 222 with a different facial identity 218 of a different individual (e.g., an avatar associated with the individual, an animated version of the individual, an "alter-ego" of the individual in the immersive environment, etc.) in the image 310. Execution engine 124 can then output the image 310 for viewing on a screen (e.g., as a 3D movie or show) and/or on an AR/VR/MR headset or device as part of an immersive experience.

Figure 3B:
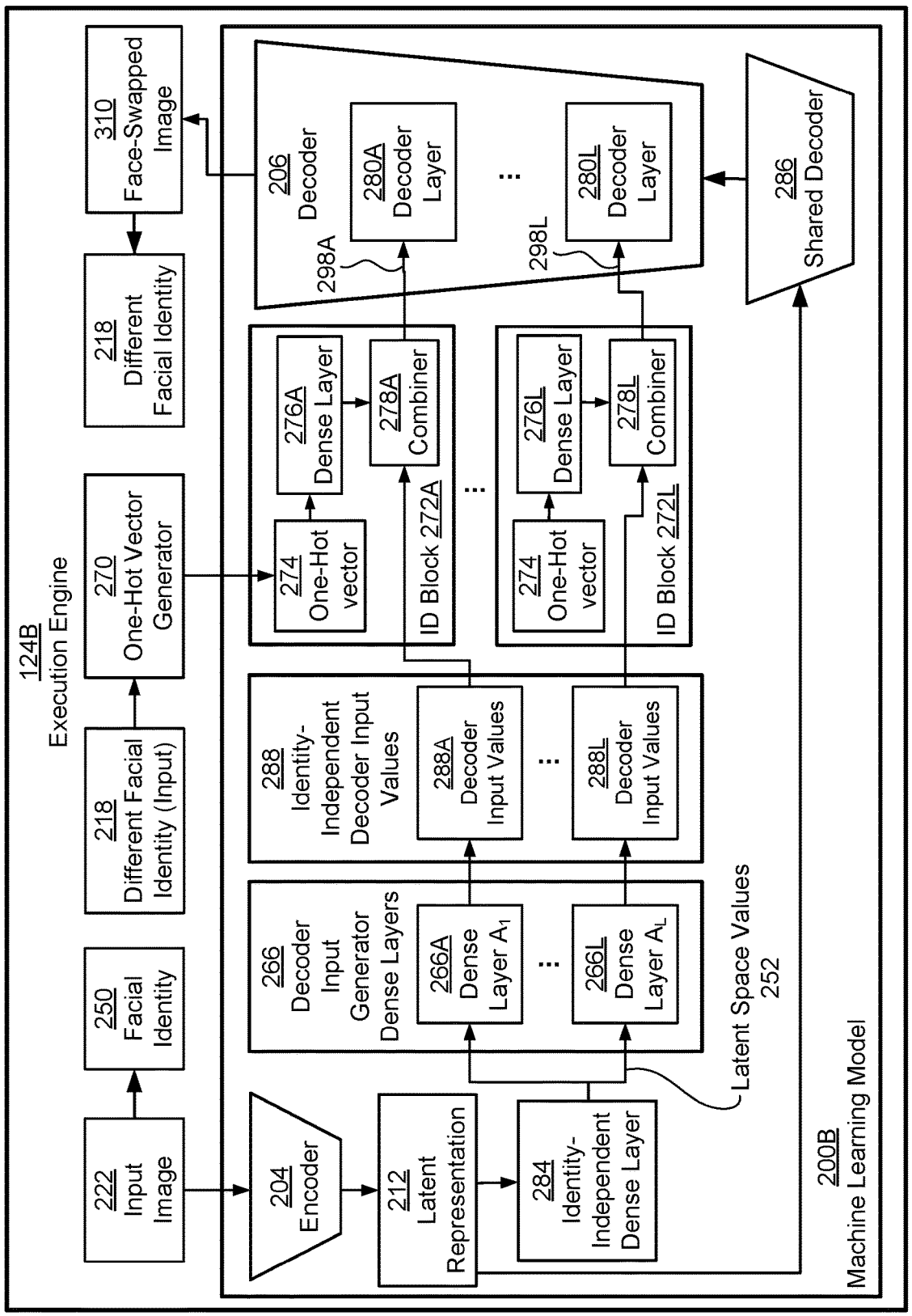
FIG. 3B illustrates an execution engine in which facial identity is represented by a one-hot vector that is combined with decoder input values, according to various embodiments.

FIG. 3B illustrates an execution engine 124B in which facial identity 250 is represented by a one-hot vector 274 that is combined with decoder input values 268, according to various embodiments. As such, FIG. 3B is a more detailed description of execution engine 124 of FIG. 1. Execution engine 124B uses the trained machine learning model 200B to change a facial identity 250 that is captured in or otherwise depicted in an input image 222 to a different facial identity 218, thereby generating a face-swapped image 310 that depicts the different facial identity 218.

Execution engine 124B uses a trained machine learning model 200B to convert an input image 222 depicting a certain facial identity 250 and a certain performance (e.g., behavior, facial expression, pose, etc.) into a face-swapped image 310 depicting a different facial identity 218 and the same performance. More specifically, execution engine 124B receives an input image 222 of a face with a certain facial identity 250. The different facial identity 218 can be specified as an input to machine learning model 200B. The different facial identity 218 can be specified as, for example, an identifier that corresponds to one of a set of facial identities 216 on which the machine learning model 200B has been trained by training engine 122B. Execution engine 124B includes a one-hot vector generator 270 that generates a one-hot vector 274 based on a specified different facial identity 218. For example, if the different facial identity 218 specifies a facial identity having a value "2" that identifies a second one of five facial identities 216 on which the machine learning model 200B has been trained, then the one-hot vector generator 270 generates a corresponding one-hot vector 274 having a value of [0, 1, 0, 0, 0]. Although the one-hot vector generator 270 is shown in FIG. 3B as being external to machine learning model 200B, the one-hot vector generator 270 can instead or in addition be included in machine learning model 200B.

The execution engine 124B uses machine learning model 200B to generate a face-swapped image 310 that includes a different facial identity 218 based on input image 222 by executing neural networks of the machine learning model 200B as described above with respect to FIG. 2B, but using the input image 222 and different facial identity 218 as input instead of the training data 214. The execution engine 124B uses a one-hot vector generator 270 to generate the one-hot vector 274 based on a specified different facial identity 218. As described above, the different facial identity 218 to be included in the face-swapped image 310 can be specified as an identifier that corresponds to one of a set of facial identities 216 on which the machine learning model 200B has been trained.

In response to receiving the input image 222 and different facial identity 218, the machine learning model 200B generates a face-swapped image 310. In operation, the encoder 204 generates a latent representation 212 of an input image 222, an identity-independent dense layer 284 converts the latent representation 212 to latent space values 252, decoder input generator dense layers 266 convert the latent space values 252 to identity-independent decoder input values 288, identity-specific processing blocks 272 convert the identity-independent decoder input values 288 to identity-specific decoder input values 298 based on a one-hot vector 274 generated from the different facial identity 218, and a decoder 206 converts the identity-specific decoder input values 298 to an face-swapped image 310.

Figure 4A:
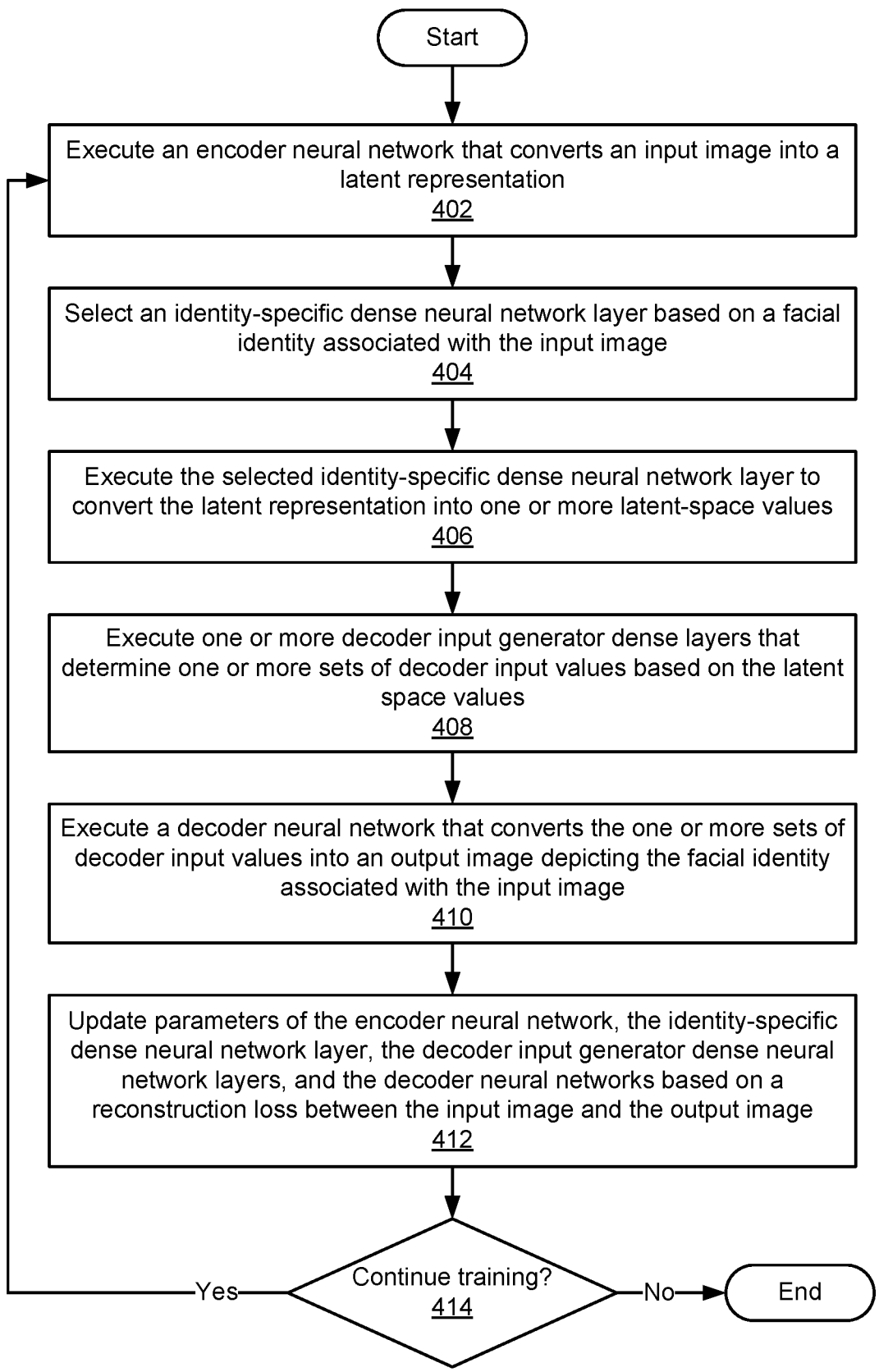
FIG. 4A is a flow diagram of method steps for training a face swapping neural network in which facial identity is represented by a selected identity-specific dense layer that converts a latent representation to latent space values for input to decoder input generator dense layers, according to various embodiments.

FIG. 4A is a flow diagram of method steps for training a face swapping neural network in which facial identity is represented by a selected identity-specific dense layer that converts a latent representation to latent space values for input to decoder input generator dense layers, according to various embodiments. Although the method steps are described in conjunction with the systems of FIGS. 1-3B, persons skilled in the art will understand that any system configured to perform the method steps in any order falls within the scope of the present disclosure.

As shown, in step 402, training engine 122A executes an encoder neural network 204 that converts an input image into a latent representation 212. For example, training engine 122A can input a normalized training image 230 of a face having a facial identity 216 into the encoder neural network 204. Training engine 122A can also use one or more convolutional layers and/or other types of neural network layers in the encoder neural network 204 to convert each normalized training image 230 into a corresponding latent representation 212 in a lower-dimensional vector space.

In step 404, training engine 122A selects an identity-specific dense neural network layer 264 based on a facial identity 216 associated with the input image. The facial identity 216 can be specified in training data 214 in association with the training image 230. For example, training engine 122A can select an identity-specific dense layer 264 that corresponds to the facial identity 216 from a set of identity-specific dense layers 260.

In step 406, training engine 122A executes the selected identity-specific dense neural network layer 264 to convert the latent representation 212 into one or more latent-space values 252. In step 408, training engine 122A executes one or more decoder input generator dense layers 266 that determine one or more sets of decoder input values 268 based on the latent-space values. The decoder input values 268 can be AdaIN coefficients, neural network weights, and/or other decoder input values 268 that control the operation of a decoder neural network 206 in converting the latent representation 212 into the output image 210.

In step 410, training engine 122A executes a decoder neural network 206 that converts the one or more sets of decoder input values 268 into an output image 210 depicting the facial identity 216 associated with the input image. Training engine 122A can use one or more convolutional layers and/or other types of neural network layers in the decoder neural network 206 to convert the decoder input values 268 into the output image 210.

In step 412, training engine 122A updates parameters of the neural networks in machine learning model 200A based on a reconstruction loss 232 between the input image 230 and the output image 210. The neural networks in machine learning model 200A that are updated can include the encoder neural network, the identity-specific dense neural network layer, the decoder input generator dense neural network layers, and the decoder neural networks. For example, the reconstruction loss can include a MSE, L1 loss, and/or another measure of the differences in pixel values between the input image 230 and the output image 210. Training engine 122A can then use gradient descent and backpropagation to update neural network weights in the neural networks of machine learning model 200A in a way that reduces the reconstruction loss.

In step 414, training engine 122A determines whether or not training using the reconstruction loss is to continue. For example, training engine 122A can determine that the neural networks in the machine learning model 200A should continue to be trained using the reconstruction loss until one or more conditions are met. These condition(s) include (but are not limited to) convergence in the parameters of the neural networks, the lowering of the reconstruction loss to below a threshold, and/or a certain number of training steps, iterations, batches, and/or epochs. While training for reconstruction continues, training engine 122A repeats steps 402-412.

Figure 4B:
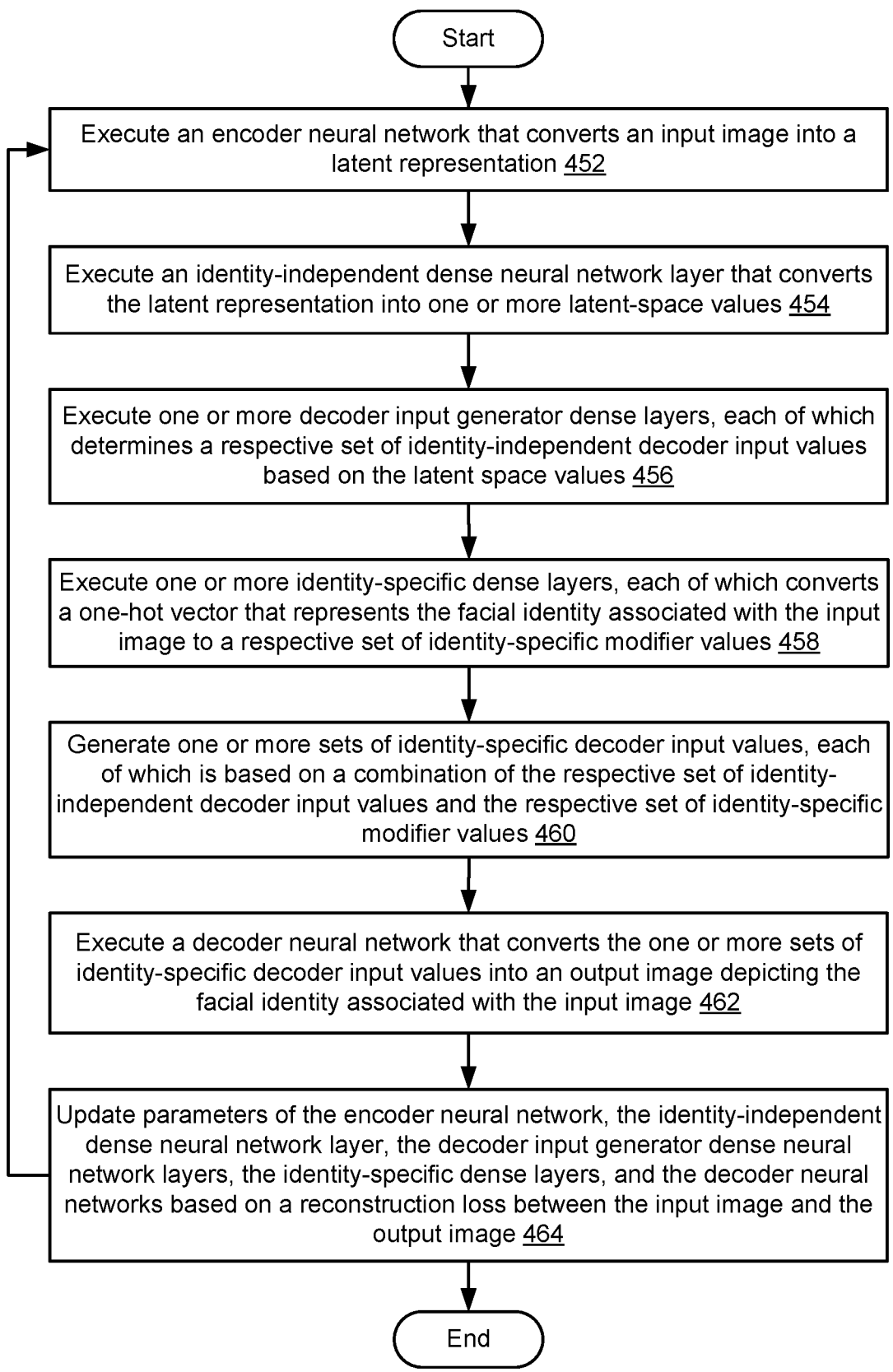
FIG. 4B is a flow diagram of method steps for training a face swapping neural network in which facial identity is represented by a one-hot vector that is combined with decoder input values, according to various embodiments.

FIG. 4B is a flow diagram of method steps for training a face swapping neural network in which facial identity is represented by a one-hot vector that is combined with decoder input values, according to various embodiments. Although the method steps are described in conjunction with the systems of FIGS. 1-3B, persons skilled in the art will understand that any system configured to perform the method steps in any order falls within the scope of the present disclosure.

As shown, in step 452, training engine 122B executes an encoder neural network that converts an input image into a latent representation 212. For example, training engine 122B can input a normalized training image 230 of a face having a facial identity 216 into the encoder neural network 204. Training engine 122B can also use one or more convolutional layers and/or other types of neural network layers in the encoder neural network 204 to convert each normalized training image 230 into a corresponding latent representation 212 in a lower-dimensional vector space.

In step 454, training engine 122B executes an identity-independent dense neural network layer 284 that converts the latent representation 212 into one or more latent-space values 252. In step 456, training engine 122B executes one or more decoder input generator dense layers 266, each of which determines a respective set of identity-independent decoder input values 288 based on the latent space values 252. In step 458, training engine 122B executes one or more identity-specific dense layers 276, each of which converts a one-hot vector 274 that represents the facial identity 216 associated with the input image 230 to a respective set of identity-specific values.

In step 460, training engine 122B generates one or more sets of identity-specific decoder input values 298, each of which is based on a combination of the respective set of identity-independent decoder input values 288 and the respective set of identity-specific values. The combination can be, for example, a sum or product of each value in the respective set of identity-independent decoder input values 288 and each respective value in the respective set of identity-specific values. In step 462, training engine 122B executes a decoder neural network 206 that converts the one or more sets of identity-specific decoder input values 298 into an output image 210 depicting the facial identity 216 associated with the input image 230.

In step 464, training engine 122B updates parameters of the neural networks in machine learning model 200B, such as the encoder neural network, the identity-independent dense neural network layer, the decoder input generator dense neural network layers, the identity-specific dense layers, and/or the decoder neural networks, based on a reconstruction loss 232 between the input image 230 and the output image 210. For example, the reconstruction loss can include a MSE, L1 loss, and/or another measure of the differences in pixel values between the input image 230 and the output image 210. Training engine 122B can then use gradient descent and backpropagation to update neural network weights in the neural networks of machine learning model 200B in a way that reduces the reconstruction loss.

Further, in step 464 or subsequent to step 464, training engine 122 determines whether or not training using the reconstruction loss is to continue. For example, training engine 122B can determine that the neural networks in the machine learning model 200A should continue to be trained using the reconstruction loss until one or more conditions are met. These condition(s) include (but are not limited to) convergence in the parameters of the neural networks, the lowering of the reconstruction loss to below a threshold, and/or a certain number of training steps, iterations, batches, and/or epochs. While training for reconstruction continues, training engine 122B repeats steps 452-464.

Figure 5A:
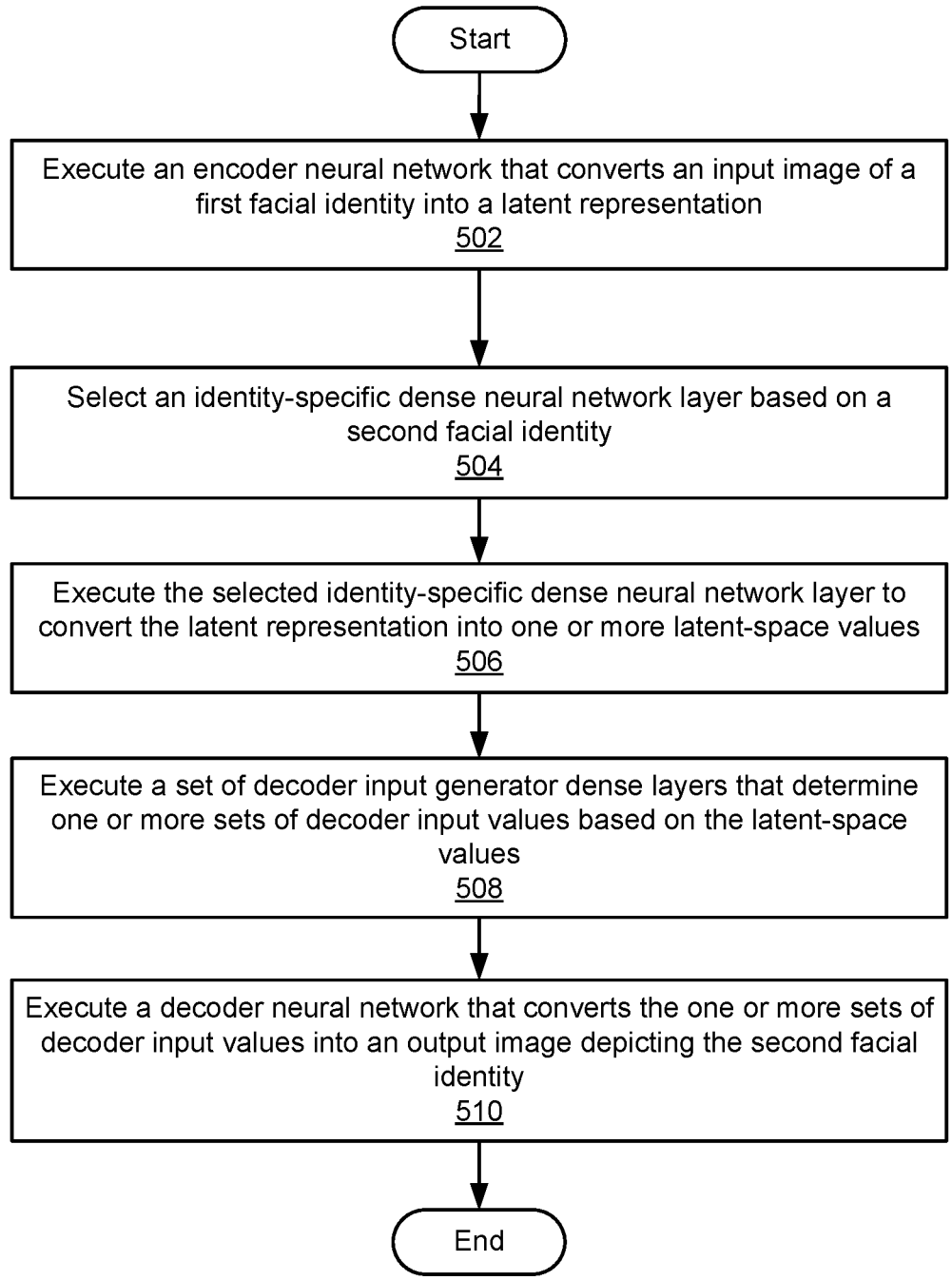
FIG. 5A is a flow diagram of method steps for performing face swapping using a neural network in which facial identity is represented by a selected identity-specific dense layer that converts a latent representation to latent space values for input to decoder input generator dense layers, according to various embodiments.

FIG. 5A is a flow diagram of method steps for performing face swapping using a neural network in which facial identity is represented by a selected identity-specific dense layer that converts a latent representation to latent space values for input to decoder input generator dense layers, according to various embodiments. Although the method steps are described in conjunction with the systems of FIGS. 1-3B, persons skilled in the art will understand that any system configured to perform the method steps in any order falls within the scope of the present disclosure.

As shown, in step 502, execution engine 124A executes an encoder neural network 204 that converts an input image 222 into a latent representation 212. For example, execution engine 124A can receive a normalized input image 222 of a first facial identity 250. Execution engine 124A can input the input image 222 into the encoder neural network 204 and obtain a corresponding latent representation 212 of the image as output of the encoder neural network 204.

In step 504, execution engine 124A selects an identity-specific dense neural network layer 264 based on a second facial identity 218. The second facial identity 218 can be a given facial identity that is different from the first facial identity 250. For example, execution engine 124A can select an identity-specific dense layer 264 that corresponds to the second facial identity 216 from a set of identity-specific dense layers 260.

In step 506, execution engine 124A executes the selected identity-specific dense neural network layer 264 to convert the latent representation 212 into one or more latent-space values 252. In step 508, execution engine 124A executes a set of decoder input generator dense layers 266 that determine one or more sets of decoder input values 268 based on the latent-space values 252.

In step 510, execution engine 124A executes a decoder neural network 206 that converts the one or more sets of decoder input values 268 into an output image 210 depicting the second facial identity 218. The output image 218 can include the performance of the input image 222 and the second facial identity 218.

Figure 5B:
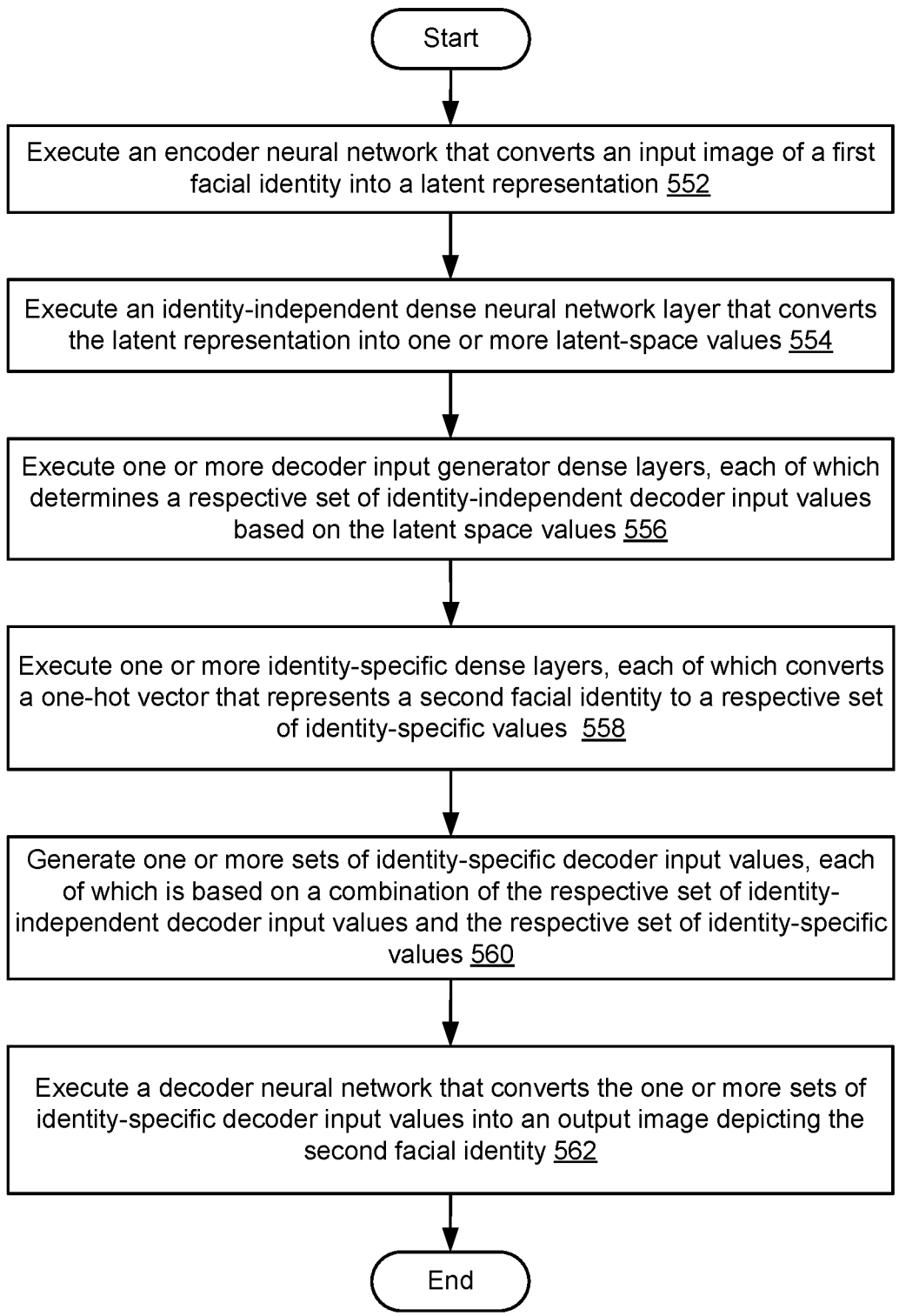
FIG. 5B is a flow diagram of method steps for performing face swapping using a neural network in which facial identity is represented by a one-hot vector that is combined with decoder input values, according to various embodiments.

FIG. 5B is a flow diagram of method steps for performing face swapping using a neural network in which facial identity is represented by a one-hot vector that is combined with decoder input values, according to various embodiments. Although the method steps are described in conjunction with the systems of FIGS. 1-3B, persons skilled in the art will understand that any system configured to perform the method steps in any order falls within the scope of the present disclosure.

As shown, in step 552, execution engine 124B executes an encoder neural network 204 that converts an input image 222 of a first facial identity 250 into a latent representation 552. For example, execution engine 124B can receive a normalized input image 222 of the first facial identity 250. Execution engine 124B can input the input image 222 into the encoder neural network 204 and obtain a corresponding latent representation 212 of the image as output of the encoder neural network 204.

In step 554, execution engine 124B executes an identity-independent dense neural network layer 284 that converts the latent representation 212 into one or more latent-space values 252. In step 556, execution engine 124B executes one or more decoder input generator dense layers 266, each of which determines a respective set of identity-independent decoder input values 288 based on the latent space values 252.

In step 558, execution engine 124B executes one or more identity-specific dense layers 276, each of which converts a one-hot vector 274 that represents a second facial identity 218 to a respective set of identity-specific values. The second facial identity 218 can be a given facial identity that is different from the first facial identity 250. For example, execution engine 124B can generate the one-hot vector 274 by converting the second facial identity 216 to a vector representation in which the vector element corresponding to the second identity has a value of 1 and each of the remaining vector elements has a value of 0.

In step 560, execution engine 124B generates one or more sets of identity-specific decoder input values 298, each of which is based on a combination of the respective set of identity-independent decoder input values 288 and the respective set of identity-specific values. In step 562, execution engine 124B executes a decoder neural network 206 that converts the one or more sets of identity-specific decoder input values 298 into an output image 310 depicting the second facial identity 218. The output image 218 can include the performance of the input image 222 and the second facial identity 218.

In sum, the disclosed techniques train and execute a machine learning model that performs face swapping using reduced-size representations of facial identity. In some embodiments, a facial identity on which the model is trained is represented in the model as an identity-specific layer of a dense neural network. The model can select a given identity to be used in an output image by selecting an identity-specific dense layer that represents the given identity. The model then provides the identity-specific dense layer to an identity-independent set of dense layers that determine and output neural network parameters for a decoder. In other embodiments, a facial identity on which the model is trained is represented as a one-hot vector that encodes the facial identity. The model can select a given identity to be used in an output image by modifying a one-hot encoded identity vector to encode the given identity. The modified identity vector is combined by the model with parameters output by an identity-independent set of dense layers decoder. The results of combining the identity vector with the parameters are provided as input to the decoder. The decoder generates an output image that is based on an input image but has the given facial identity instead of the facial identity of the input image. The parameters provided to the decoder can be AdaIN coefficients that control the operation of layers in the decoder, or the values of weights within such layers, allowing the model to change the identity of a face in the input image to produce the output image.

One technical advantage of the disclosed techniques relative to the prior art is that the machine learning models used in the disclosed techniques are substantially more memory efficient. For each additional identity on which the model is trained using the disclosed techniques, the size of the machine learning model increases by a much smaller amount than in prior art techniques. Instead of adding a set of neural network layers for each additional identity, for example, the disclosed techniques can add a single network layer in some embodiments, or a single one-hot encoded identity vector in other embodiments. Accordingly, in comparison with prior art techniques, the size of the machine learning model used by the disclosed techniques is nearly independent of the number of identities being trained. Another technical advantage of the disclosed techniques is the ability to switch between identities in the machine learning model by changing a single network layer in some embodiments, or by changing the values in a one-hot encoded identity vector in other embodiments. Thus, the disclosed techniques can switch between identities more efficiently than previous techniques that involved changing a set of neural network layers when switching between identities. Further, the disclosed techniques can train the machine learning model with multiple identities in one batch. Such training with multiple identities in a batch tends to provide enhanced face swapping quality and enhanced generalization capabilities.

In some embodiments, the selected identity-specific dense layer can include dense layers for two or more identities, or two or more identity-specific dense layers can be selected, each for a different identity. Multiple identities can be selected in this way to, for example, interpolate between two individuals. The selected identity-specific dense layer 264 (e.g., identity vector) can be averaged for two facial identities to generate a mixture of the two facial identities. The two facial identities can be the same person at different ages, for example, to achieve an age between the ages of the two identities. In another example, two or more identities can be averaged to generate facial identity of a new person that is the average of two or more different people. These technical advantages provide one or more technological improvements over prior art approaches.

1. In some embodiments, a computer-implemented method for performing face swapping comprises: generating a latent representation of a first facial identity included in an input image; identifying a first identity-specific neural network layer associated with a second facial identity from a plurality of identity-specific neural network layers, wherein each neural network layer included in the plurality of identity-specific neural network layers is associated with a different facial identity; executing the first identity-specific neural network layer and one or more other neural network layers to generate one or more decoder input values corresponding to the latent representation; and executing a decoder neural network that converts the one or more decoder input values into an output image depicting the second facial identity.

2. The computer-implemented method of clause 1, wherein one of the plurality of identity-specific neural network layers is stored in memory and at least one second identity-specific neural network layer of the plurality of identity-specific neural network layers is stored in persistent storage.

3. The computer-implemented method of clause 1 or clause 2, wherein identifying the first identity-specific neural network layer comprises retrieving the first identity-specific neural network layer persistent storage.

4. The computer-implemented method of any of clauses 1-3, wherein retrieving the first identity-specific neural network layer from the persistent storage comprises searching the persistent storage for the second facial identity, wherein the first identity-specific neural network layer is associated with the second facial identity in the persistent storage.

5. The computer-implemented method of any of clauses 1-4, wherein identifying the first identity-specific neural network layer comprises replacing a previously-selected identity-specific neural network layer with the first identity-specific neural network layer.

6. The computer-implemented method of any of clauses 1-5, wherein identifying the identity-specific neural network layer comprises de-allocating memory used by the previously-selected identity-specific neural network layer.

7. The computer-implemented method of any of clauses 1-6, wherein the first identity-specific neural network layer generates one or more latent space values based on the latent representation of the first facial identity, and wherein the one or more other neural network layers generate the one or more decoder input values based on the one or more latent space values.

8. The computer-implemented method of any of clauses 1-7, further comprising: training one or more neural networks based on a loss associated with the input image and the output image, wherein the one or more neural networks include the first identity-specific neural network layer.

9. The computer-implemented method of any of clauses 1-8, wherein the one or more neural networks being trained further include the decoder input generator neural network layers and the decoder neural network.

10. The computer-implemented method of any of clauses 1-9, wherein the loss comprises a reconstruction loss determined based on a difference between the input image and the output image.

11. The computer-implemented method of any of clauses 1-10, wherein the given facial identity comprises at least one of a personal identity, an age, or a lighting condition.

12. The computer-implemented method of any of clauses 1-11, wherein the one or more other neural network layers comprise one or more decoder input generator dense neural network layers that generate the one or more decoder input values.

13. The computer-implemented method of any of clauses 1-12, wherein executing the first identity-specific neural network layer comprises: generating an identity-specific one-hot vector based on the second facial identity; executing the first identity-specific neural network layer to generate one or more values based on the identity-specific one-hot vector; and generating, based on the one or more values, the one or more decoder input values corresponding to the latent representation.

14. In some embodiments, one or more non-transitory computer-readable media store instructions that, when executed by one or more processors, cause the one or more processors to perform the steps of: generating a latent representation of a first facial identity included in an input image; executing one or more identity-independent neural network layers to generate one or more decoder input values corresponding to the latent representation; executing one or more layers associated with a second facial identity to generate one or more identity-specific decoder input values; and executing a decoder neural network that converts the one or more decoder input values and one or more identity-specific decoder input values into an output image depicting the second facial identity.

15. The one or more non-transitory computer-readable media of clause 14, wherein the one or more identity-independent neural network layers include an identity-specific neural network layer that generates one or more latent space values based on the latent representation of the first facial identity.

16. The one or more non-transitory computer-readable media of clause 14 or clause 15, wherein the one or more identity-independent neural network layers further include one or more decoder input generator neural network layers that generate the one or more decoder input values based on the one or more latent space values.

17. The one or more non-transitory computer-readable media of any of clauses 14-16, further comprising: training one or more neural networks based on a loss associated with the input image and the output image, wherein the one or more neural networks include the one or more layers associated with a second facial identity.

18. The one or more non-transitory computer-readable media of any of clauses 14-17, wherein executing the first identity-specific neural network layer comprises: generating an identity-specific one-hot vector based on the second facial identity; executing the one or more layers associated with the second facial identity to generate one or more values based on the identity-specific one-hot vector; and generating, based on the one or more values, the one or more decoder input values corresponding to the latent representation.

19. In some embodiments, a system comprises one or more memories that store instructions, and one or more processors that are coupled to the one or more memories and, when executing the instructions, are configured to perform the steps of: generating a latent representation of a first facial identity included in an input image; identifying a first identity-specific neural network layer associated with a second facial identity from a plurality of identity-specific neural network layers, wherein each neural network layer included in the plurality of identity-specific neural network layers is associated with a different facial identity; executing the first identity-specific neural network layer and one or more other neural network layers to generate one or more decoder input values corresponding to the latent representation; and executing a decoder neural network that converts the one or more decoder input values into an output image depicting the second facial identity.

20. The system of clause 19, wherein one of the plurality of identity-specific neural network layers is stored in memory and at least one second identity-specific neural network layer of the plurality of identity-specific neural network layers is stored in persistent storage.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing face swapping, the computer-implemented method comprising:
    generating a latent representation of a first facial identity included in an input image;
    identifying a first identity-specific neural network layer associated with a second facial identity from a plurality of identity-specific neural network layers, wherein each neural network layer included in the plurality of identity-specific neural network layers is associated with a different facial identity, and wherein identifying the first identity-specific neural network layer comprises replacing a previously-selected identity-specific neural network layer with the first identity-specific neural network layer;
    executing the first identity-specific neural network layer and one or more other neural network layers to generate one or more decoder input values corresponding to the latent representation; and
    executing a decoder neural network that converts the one or more decoder input values into an output image depicting the second facial identity.

2. The computer-implemented method of claim 1, wherein one of the plurality of identity-specific neural network layers is stored in memory and at least one second identity-specific neural network layer of the plurality of identity-specific neural network layers is stored in persistent storage.

3. The computer-implemented method of claim 1, wherein identifying the first identity-specific neural network layer comprises retrieving the first identity-specific neural network layer from persistent storage.

4. The computer-implemented method of claim 3, wherein retrieving the first identity-specific neural network layer from the persistent storage comprises searching the persistent storage for the second facial identity, wherein the first identity-specific neural network layer is associated with the second facial identity in the persistent storage.

5. The computer-implemented method of claim 1, wherein identifying the first identity-specific neural network layer comprises de-allocating memory used by the previously-selected identity-specific neural network layer.

6. The computer-implemented method of claim 1, wherein the first identity-specific neural network layer generates one or more latent space values based on the latent representation of the first facial identity, and
    wherein the one or more other neural network layers generate the one or more decoder input values based on the one or more latent space values.

7. The computer-implemented method of claim 1, further comprising:
    training one or more neural networks based on a loss associated with the input image and the output image, wherein the one or more neural networks include the first identity-specific neural network layer.

8. The computer-implemented method of claim 7, wherein the one or more neural networks being trained further include one or more decoder input generator neural network layers corresponding to the one or more other neural network layers and the decoder neural network.

9. The computer-implemented method of claim 7, wherein the loss comprises a reconstruction loss determined based on a difference between the input image and the output image.

10. The computer-implemented method of claim 1, wherein the first facial identity comprises at least one of a personal identity, an age, or a lighting condition.

11. The computer-implemented method of claim 1, wherein the one or more other neural network layers comprise one or more decoder input generator dense neural network layers that generate the one or more decoder input values.

12. The computer-implemented method of claim 1, wherein
    the one or more decoder input values correspond to one or more adaptive instance normalization coefficients that modify convolution operations performed by the decoder neural network.

13. One or more non-transitory computer-readable media storing instructions that, when executed by one or more processors, cause the one or more processors to perform the steps of:
    generating a latent representation of a first facial identity included in an input image;

executing one or more identity-independent neural network layers to generate one or more decoder input values corresponding to the latent representation;

executing one or more neural network layers associated with a second facial identity to generate one or more identity-specific decoder input values based on the one or more decoder input values; and executing a decoder neural network that converts the one or more identity-specific decoder input values into an output image depicting the second facial identity.

14. The one or more non-transitory computer-readable media of claim 13, wherein the one or more identity-independent neural network layers include:

an identity-independent neural network layer that generates one or more latent space values based on the latent representation of the first facial identity; and one or more decoder input generator neural network layers that generate the one or more decoder input values based on the one or more latent space values.

15. The one or more non-transitory computer-readable media of claim 13, wherein executing the decoder neural network comprise:

inputting a first portion of the one or more identity-specific decoder input values into a first decoder layer in the decoder neural network;

inputting a second portion of the one or more identity-specific decoder input values into a second decoder layer in the decoder neural network; and executing the first decoder layer and the second decoder layer to generate the output image.

16. The one or more non-transitory computer-readable media of claim 13, further comprising:

training one or more neural networks based on a loss associated with the input image and the output image, wherein the one or more neural networks include the one or more neural network layers associated with the second facial identity.

17. The one or more non-transitory computer-readable media of claim 13, wherein executing the one or more neural network layers associated with the second facial identity comprises:

generating an identity-specific one-hot vector corresponding to the second facial identity;

executing the one or more neural network layers associated with the second facial identity to generate one or more values based on the identity-specific one-hot vector; and generating, based on the one or more values, the one or more decoder input values corresponding to the latent representation.

18. A system, comprising:

one or more memories that store instructions, and one or more processors that are coupled to the one or more memories and, when executing the instructions, are configured to perform the steps of:

generating a latent representation of a first facial identity included in an input image;

identifying a first identity-specific neural network layer associated with a second facial identity from a plurality of identity-specific neural network layers, wherein each neural network layer included in the plurality of identity-specific neural network layers is associated with a different facial identity, and wherein identifying the first identity-specific neural network layer comprises replacing a previously-selected identity-specific neural network layer with the first identity-specific neural network layer;

executing the first identity-specific neural network layer and one or more other neural network layers to generate one or more decoder input values corresponding to the latent representation; and executing a decoder neural network that converts the one or more decoder input values into an output image depicting the second facial identity.

19. The system of claim 18, wherein one of the plurality of identity-specific neural network layers is stored in memory and at least one second identity-specific neural network layer of the plurality of identity-specific neural network layers is stored in persistent storage.

* * * * *